United States Patent Office 3,371,064
Patented Feb. 27, 1968

3,371,064
FLUOROPHENYL VINYL ETHERS AND THEIR POLYMERS
Leo A. Wall, Washington, D.C., and Walter J. Pummer, Rockville, Md., assignors to the United States of America as represented by the Secretary of the Navy
No Drawing. Filed Dec. 29, 1964, Ser. No. 422,090
6 Claims. (Cl. 260—47)

The invention described herein may be manufactured and used by or for the Government of the United States of America for governmental purposes without the payment of any royalties thereon or therefor.

This invention is directed to the preparation of the monomers: pentafluorophenyl vinyl ether; 1,2-difluorovinyl pentafluorophenyl ether and 2,2-difluorovinyl pentafluorophenyl ether and to polymers obtained from these monomers as well as the methods used both in the preparation and in the decomposition.

Heretofore and in the present there is a desire to obtain a high weight polymer which will be thermally stable at temperatures over 500° C. Many intermediates are found during the search for such a product which have properties of their own and have a use as an adhesive, a lubricant, a rubber or some other product. The above-named monomers and their polymers, while probably being useful as intermediates in the preparation of a product which would be thermally stable at high temperatures, have certain properties which render them useful as insulating coating or any analogous use where a good heat conducting material would be desired.

The objects of the present invention are the synthesis and preparation of the monomers: pentafluorophenyl vinyl ether, 1,2-difluorovinyl pentafluorophenyl ether and 2,2-difluorovinyl pentafluorophenyl ether and polymers thereof.

Other objects, advantages and novel features of the invention will become apparent from the following detailed description of the invention.

PENTAFLUOROPHENYL ALKYL ETHERS

The pentafluorophenyl alkyl ethers were synthesized as possible precursors to pentafluorophenyl vinyl ether. In the past, various derivatives of fluorinated anisoles and phenetoles have been prepared by the nucleophilic alkoxide attack on hexafluorobenzene. 2-pentafluorophenoxy-1,1,1-trifluoroethane has been synthesized from hexafluorobenzene and sodium trifluoroethoxide using tetrahydrofuran as a solvent. In an attempt to prepare 2-pentafluorophenoxyethyl bromide by the procedure, difficulties were encountered in making the salt of ethylene bromohydrin. Once the salt forms, it readily decomposes to sodium bromide and ethylene oxide. 2-pentafluorophenoxy-ethyl bromide was conveniently synthesized by the reverse reaction, i.e., from potassium pentafluorophenoxide and 1,2-dibromoethane. This reaction was found to proceed more rapidly in n,n-dimethylformamide than in tetrahydrofuran. In this reaction, even though a large excess of dibromoethane was employed, a fair amount of 1,2-bis(pentafluorophenoxy)ethane was always isolated. A similar reaction resulted in the isolation of the1,1-bis(pentafluorophenoxy)ethane. Once one pentafluorophenoxy group is attached to the carbon containing the bromine atom, the remaining bromine atom is easily displaced by pentafluorophenoxide ion under the basic reaction conditions. The fact that some free pentafluorophenol was obtained would indicate that some of the pentafluorophenoxide was depleted due to some dehydrohalogenation reaction.

In a like manner, 2-pentafluorophenoxy-ethyl chloride was prepared from 1,2-dichloroethane and potassium pentafluorophenoxide. Only the mono chloro derivative was obtained in this reaction.

2-pentafluorophenoxyethanol was also synthesized by this method from ethylene bromohydrin and potassium pentafluorophenoxide except in this case tetrahydrofuran served satisfactorily as the reaction medium. Since pentafluorophenoxide is considered a weak nucleophile, the choice of either tetrahydrofuran or n,n,-dimethylformamide as a solvent for these reactions appears to depend on the relative activity of the halide to be replaced. For example, at 90° C. in dimethylformamide, the reaction between pentafluorophenoxide and 1,2-dibromoethane is essentially completed in a few hours, while the yield of product with refluxing tetrahydrofuran for 18 hours was only 15%.

Both the acetate and trifluoroacetate of 2-pentafluorophenoxyethanol were prepared in high yield by refluxing the alcohol and the appropriate anhydride for one hour.

PENTAFLUOROPHENYL VINYL ETHER

Phenyl vinyl ether and pentachlorophenyl vinyl ether have been prepared previously, usually by the base catalyzed addition of phenol or pentachlorophenol to acetylene. We have now extended this reaction to pentafluorophenol. Pentafluorophenyl vinyl ether can be prepared in 50% yield by this method. The reaction temperature was 200° C., and a fair excess of acetylene was used to control the by-products, usually 1,1-bis(pentafluorophenoxy)ethane. Previously, methanol and water were the preferred solvents. To prevent possible exchange reactions of potassium pentafluorophenoxide in protonic solvents at high temperature, we have used n,n,-dimethylacetamide for this reaction with equal success.

Although the above method for the synthesis of pentafluorophenyl vinyl ether was satisfactory, we have also investigated alternate preparations. These methods included dehydrohalogenation or cleavage of various substituted alkyl ethers by pyrolytic means and/or basic reagents. These reactions also gave valuable information regarding the relative stability of these fluoroaryl ethers under these conditions. Furthermore, these compounds may serve as model compounds in studying the decomposition products obtained from the pyrolysis of the polymeric fluoroaryl vinyl ethers.

PYROLYSIS

The pyrolysis of a number of these fluoroaryl ethers with various substituents on the alkyl side chain were performed using glass helices, charcoal pellets or 20% potassium hydroxide-charcoal pellets as the column packing. Temperatures ranged from 400 to 600° C. Usually, atmospheric pressure was maintained, but in a few cases, the pyrolysis was done under reduced pressures. The conditions and the results of the pyrolyses of these pentafluorophenyl ethers are listed in Table I. For the most part, the pyrolyses appear to follow the paths as outlined in Equations 1 and 2.

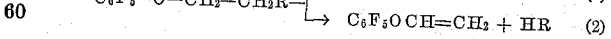
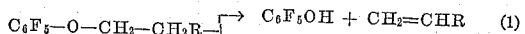

$$C_6F_5-O-CH_2-CH_2R \longrightarrow C_6F_5OH + CH_2=CHR \quad (1)$$
$$\longrightarrow C_6F_5OCH=CH_2 + HR \quad (2)$$

In general, more pentafluorophenol was found in the pyrolyzates than was pentafluorophenyl vinyl ether. The relative amounts of each substance appears to depend on the nature of the R group as well as the temperature employed in the pyrolysis.

The distribution of products seems to indicate at first glance that random scission are occurring according to Equations 1 and 2. These reactions are further complicated by the competing secondary reactions which appeared to yield products which were simple addition products of the olefin formed from the initial pyrolysis, such as in Equations 3 and 4 or various combinations thereof.

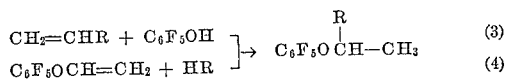

$$CH_2=CHR + C_6F_5OH \atop C_6F_5OCH=CH_2 + HR \Bigg\} \rightarrow C_6F_5O\underset{|}{\overset{R}{C}H}-CH_3 \quad (3)\atop(4)$$

This was especially evident in the case of the bromine derivative (Table I, R=Br). The large amount of 1-bromo-1-pentafluorophenoxyethane formed in this pyrolysis would seem to indicate both types of reactions (Equations 3 and 4) had occurred.

The chlorine analog (Table I, R=Cl) was more stable at 500° C. than the bromine derivative, as a result, conversion was much lower. However, pentafluorophenol and pentafluorophenyl vinyl ether were formed in approximately equal quantities along with a trace of 1-chloro-1-pentafluorophenoxyethane.

From the pyrolysis of the acetate (Table I, R=OAc), pentafluorophenol was usually the main product with lesser amounts of the pentafluorophenyl vinyl ether and acetic acid along with varying amounts of five other products (unidentified). When the acetate was pyrolyzed under reduced pressures at different temperatures, no significant change in product distribution was observed except conversions were lower. At the same pressure (0.8 mm.) and raising the temperature from 550° C. to 600° C., simply increased the amount of pentafluorophenol.

At a higher pressure (25 mm.) and 540° C., the pyrolysis of the acetate gave essentially the same products as observed at atmospheric pressure and 560° C. The above acetate pyrolyses agree to some extent with those reported for 2-phenoxyethyl acetate. In our case, the yield of pentafluorophenyl vinyl ether is higher and probably reflects the increased stability of the vinyl ether due to the ring fluorines. Recently, it has been shown from the relative base strengths of trifluoroethyl amine and pentafluorobenzyl amine that the trifluoromethyl group is a more effective electronegative group than the pentafluorophenyl group. On this basis, the pyrolysis of 2-pentafluorophenoxyethyl trifluoroacetate was expected to cleave preferentially at the alkyl-trifluoroacetate bond to yield pentafluorophenyl vinyl ether in great quantities. The additional fluorines stabilized the compound for only 30% conversion to products was obtained at 540° C./25 mm. pressure. Pentafluorophenol, pentafluorophenyl vinyl ether and trifluoroacetic acid were formed in almost equal quantities. Since no selective cleavage was encountered, further pyrolyses of the acetates were not pursued.

The pyrolysis of 2-pentafluorophenoxyethanol (Table I, R=OH) our alumina at 300° C. or 420° C. resulted in pentafluorophenol and acetaldehyde. No dehydration to pentafluorophenyl vinyl ether was observed. Similar results were reported for 2-phenoxyethanol.

Potassium acid sulfate at 220° C. failed to dehydrate the alcohol, nor was any product other than 2-pentafluorophenoxyethanol recovered.

Additional pyrolyses were performed on compounds containing the pentafluorophenoxy group (Table II-A). For comparison purposes, some hydrocarbon samples (Table II-B) were also included. It was first believed that some of the products produced were breakdown products of pentafluorophenyl vinyl ether itself. However, this compound (Table II-A, R=CH=CH₂) does not show any appreciable decomposition until 600° C. It was thought that 1,1-bis(pentafluorophenoxy)ethane, Table II-A,

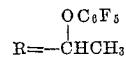

$$R=-\underset{|}{\overset{OC_6F_5}{C}H}CH_3$$

formed from the pyrolysis of 2-pentafluorophenoxyethyl bromide (Table I, R=Br) was due to the addition of pentafluorophenol to pentafluorophenyl vinyl ether (Equation 4; R=C₆F₅O—). The pyrolysis of a 50% mixture of the latter two compounds (Table II-A, R=CH=CH₂ and H) gave only starting materials. This mode of addition is not entirely without merit, since it was subsequently shown that 1,1-bis(pentafluorophenoxy) ethane, Table II-A,

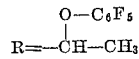

$$R=-\underset{|}{\overset{O-C_6F_5}{C}H}-CH_3$$

decomposes almost quantitatively to pentafluorophenol and pentafluorophenyl vinyl ether. The high yield of olefin formed in this pyrolysis was similar to that obtained for 1,1-diethoxyethane.

The other rearranged product obtained from the pyrolysis of 2-pentafluorophenoxyethyl bromide (Table I, R=Br) was 1-bromo-1-pentafluorophenoxyethane. This compound may have been formed as visualized in Equations 3 and 4. The instability of -halo ethers is well known. The pyrolysis of 2-phenoxyethyl bromide (Table II-B, R=CH₂CH₂Br) gave only the 1-bromo-1-phenoxyethane as its main product, similar to what was observed in the fluorocarbon series. The two isomeric bromides (hydrocarbon) differed greatly in chemical behavior and can easily be distinguished by their reaction with water at room temperature. The 1-bromo-1-phenoxyethane decomposes spontaneously into a red resinous product with the liberation of hydrogen bromide by the addition of a trace amount of water. The 2-bromo derivative has little tendency toward this type of reaction. In the fluorocarbon series, 1-bromo-1-pentafluorophenoxyethane does not exhibit this readiness to react with water as does the hydrocarbon analog. In storage at 25° C. in the dark for several weeks, the 1-bromo-1-pentafluorophenoxyethane decomposed to a blackish mass. The 1-bromo-1-pentafluorophenoxyethane was not obtained in a pure state so that its thermal stability was not recorded.

From the results of the pyrolyses of the fluoroaryl ethers listed in Table I, some generalizations are apparent. In these cases, where the reaction path could have proceeded in two directions, i.e., according to Equations 1 and 2, usually pentafluorophenol was obtained in greater quantity. The conversion to products at the temperatures employed also serve as a measure of the thermal stability of the fluoroaryl alkyl ethers. The results in Tables I and II indicate that the pentafluorophenoxy group is a more effective leaving group when in competition with the other functional groups (R) shown. This effect appears to be associated with the number and activity of the β-hydrogens in the molecule. In the pyrolysis of 2-pentafluorophenoxy-1,1,1-trifluoroethane (Table II-A, R=CH₂CF₃) (a compound containing only α-hydrogens but no β-hydrogens to the oxygen atom) no cleavage to pentafluorophenol was observed, only dehydrofluorination to the olefin. Similarly, where the β-hydrogens are attached to a double bond as in pentafluorophenyl vinyl ether (Table II-A, R=CH=CH₂) pentafluorophenol is formed at higher temperatures. However, pentafluorophenetole (Table II, R=CH₂CH₃) containing three β-hydrogens, yield pentafluorophenol and at lower temperatures. Pentafluoroanisole also yields small amounts of pentafluorophenol even though no β-hydrogens are available (probably a bimolecular reaction).

In the case of the isomeric bis(pentafluorophenoxy) ethanes, 1,2 Table I, R=OC₆F₅ and 1,1 Table II-A,

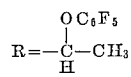

$$R=-\underset{H}{\overset{OC_6F_5}{\underset{|}{C}}}-CH_3$$

the position of the R Group has decided effect on the course of pyrolysis. Each pentafluorophenoxy group in the 1,1-position has three available β-hydrogens for reaction, while in the 1,2-case each pentafluorophenoxy group has only two. On this basis, the 1,1-compound would be less stable. Also, the 1,1-derivative is an acetal containing two bulky groups which in itself is conducive to thermal decomposition at lower temperatures.

The pyrolysis of the hydrocarbon ether listed in Table

II-B, phenetole (R=CH₂CH₃) and phenyl vinyl ether have been carried out with a flow system-type pyrolysis. A comparison of the results for phenetole (Table II-B, R=CH₂CH₃) and pentafluorophenetole (Table II-A, R=CH₂CH₃) indicate the latter compound to be much less stable. The pentafluorophenyl vinyl ether is more thermally stable than the phenyl vinyl ether.

A considerable amount of data is available in the literature concerning the pyrolysis of ethers as well as other types of compounds such as esters, halides, amides, etc. The decomposition for the most part is considered to be unimolecular in nature and a cyclic mechanism was proposed.

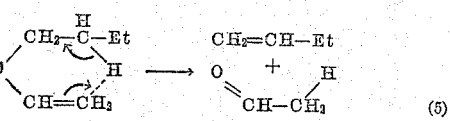

Certainly, a similar mechanism may be written for the fluoroaryl ethers,

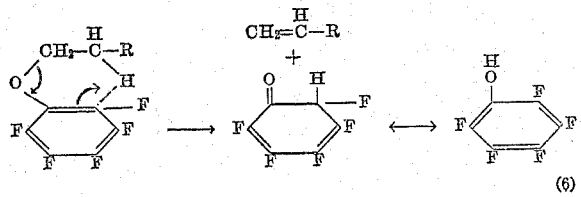

The difficulty with this type of mechanism for the aromatic compounds is the interruption of aromaticity and the subsequent rearrangement of pentafluorophenol. It has been concluded that the peroxide initiated rearrangement of benzyl vinyl ether at 170° C. does not favor interruption of aromaticity under these conditions. However, the above mechanism is not considered to be a free radical process. An alternate mechanism may be written for the fluoroaromatic ethers as follows:

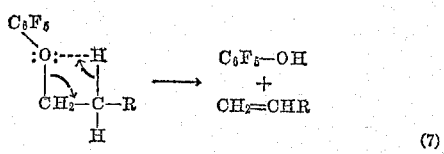

In this case, the pentafluorophenyl group is not involved in the transfer of electrons, thereby preserving aromaticity; but a four member ring supercedes the more favored six membered ring. At present, since both mechanisms involve —β hydrogens, the products may be explained by either one. The fact that no ring hydrogen containing fluorophenols were produced would indicate that hydrogen rather than fluorine migration occurs in Equation 6, which is expected. By reverse reasoning, the absence of any hydro-fluorophenols may be construed as favoring the later mechanism (Eq. 7).

The reactions of some fluoroaryl alkyl ethers with potassium hydroxide are listed in Table III. These ethers could have reacted in three ways: (a) dehydrohalogenation to an olefin, (b) cleavage at the ether oxygen to a phenol, (c) attack on the ring fluorines, or (d) various combinations of the above. Information regarding the stability of these fluoroaryl alkyl ethers towards basic reagents may aid in elucidating the cleavage reaction found when pentafluoroanisole was treated with ammonia or the fluorodihydroxy compounds obtained from the reaction of hexafluorobenzene with alcoholic potassium hydroxide. From the limited number of reactions attempted only the pentafluorophenoxyethyl bromide showed any reactivity at 200° C. or below. In this case, cleavage to pentafluorophenol was the main route when potassium hydroxide and water or paraffin oil was used. Dehydrohalogenation was the preferred course with solid potassium hydroxide pellets and pentafluorophenyl vinyl ether was obtained.

2-pentafluorophenoxy-1,1,1-trifluoroethane (Table III, R=CH₂CF₃) failed to react with either solid potassium hydroxide or magnesium oxide at 200° C. Some olefin was formed by the use of 20% potassium hydroxide mounted on charcoal pellets at 480° C. Higher temperatures decomposed the compound. The latter decomposition was also observed for 2-pentafluorophenoxyl-1,1,2,2-tetrafluoroethane (Table III, R=CF₂—CF₂H).

The stability of 1,1-bis(pentafluorophenoxy)ethane towards aqueous potassium hydroxide was unexpected in view of the acidic hydrogen due to the effect of the pentafluorophenoxy groups attached to the same carbon. This behaivior to aqueous bases is more analogous to compounds such as difluoromethyl ethyl ether or difluoromethyl phenyl ether rather than an acetal. In this case, the pentafluorophenoxy groups appear to behave as pseudo-halogens.

From the preceding sections, data was obtained regarding the stability of these fluoroaryl ethers under pyrolysis conditions or toward basic reagents. It was desirous, therefore, to obtain data concerning their reactivity with sulfuric acid. Pentafluoroanisole was shown to cleave with hydriodic acid to pentafluorophenol. Later, hydrobromic or aluminum chloride was also found effective for this reaction. Recently, it has been shown that the 4-trifluoromethyl-2,3,5,6,-tetrafluorophenetole cannot be cleaved preferentially without reaction at another part of the molecule (primarily due to the para-trifluoromethyl group). From the ethers listed in Table IV, most of them cleave to pentafluorophenol under the reaction conditions. Only 2-pentafluorophenoxy-1,1,1-trifluoroethane (Table IV, R=CH₂CF₃) failed to yield any product. The stability of this later compound is probably associated with the decrease in basicity of the oxygen linkage due to the added trifluoromethyl group. Cleavage of ethers by acids is usually preceded by oxonium salt formation. The fact that 1,1-bis(pentafluorophenoxy) ethane, Table IV,

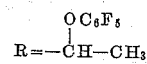

decomposes under these conditions is not surprising since the trifluoromethyl group is a more effective electronegative group than the pentafluorophenoxy group. As such, the reduction in oxygen basicity is not sufficient to prevent oxonium salt formation and eventual cleavage.

POLYMERIZATIONS

The polymerization of phenyl and pentafluorophenyl 1,1,2-trifluorovinyl ethers are known. Usually, cationic or peroxide initiated catalyses of the monomers gave little or no polymer. However, by the use of high pressure and γ-irradiation, these monomers were converted to low molecular weight polymers (DP_n~4000).

In line with the above results, 1,2-difluorovinylpentafluorophenyl ether failed to yield any polymer with azobis(isobutyronitrile). Thermally at 110° C., it appears that only dimer was formed. As yet, no high pressure techniques have been employed in the polymerization of this monomer.

Pentafluorophenyl vinyl ether appears to be a more reactive monomer. A white, solid polymer can be obtained from pentafluorophenyl vinyl ether in pentane solution by the use of boron trifluoride gas at —78° C. After 24 hours under these conditions the conversion to polymer was 17% and the molecular weight was 10,000 (M.P. 75–80° C.) Higher conversions (33%) and polymers with increased molecular weights (17,000) were obtained by longer storage times (7 days) at —78° C. and by periodic addition of the catalyst, boron trifluoride-water. Some observations made during this latter process appear to indicate that the amount of the co-catalyst water has more effect on the conversion to polymers than either excess boron trifluoride or longer reaction times. After three days, the amount of polymer formed was approximately the same as after the 24 hour period, but polymer formation again appears to increase when additional water or moisture was introduced. The polymer obtained in this fashion (17,000 M.W.) was a hard, white solid. It was soluble in benzene, hexafluorobenzene and acetone. The polymer was insoluble in methanol and water. Also, the melting point, 55–60° C., was lower than the 10,000 M.W. polymer. Small samples of both polymers were heated in air to 290° C. without any discoloration.

Aluminum chloride and pentafluorophenyl vinyl ether in bulk at 35° C. gave only blackish tars. However, a low molecular weight polymer was obtained when the polymerization was performed in benzene solution at 80° C. Methanol was used to precipitate the polymer. The molecular weight was 2300 as determined in a vapor pressure osmometer. The polymer obtained in this fashion was a yellow glass and it melted over the range 120–180° C. The low molecular weight of the polymer is in accord with recent observations concerning the polymerizations of various mono- and di-halogenated phenyl vinyl ethers.

Cationic reagents, such as concentrated hydrobromic acid have no effect on pentafluorophenyl vinyl ether. This is in contrast to phenyl vinyl ether which yields resinous materials after a slight induction period. Similar material was obtained by the addition of water to 1-bromo-1-pentafluorophenoxyethane.

Again, by the use of high pressure (9500 atm.), γ-irradiation (0.009 mr./hr.) at 105° C. for 68 hours, a poly(pentafluorophenyl vinyl ether) was obtained in low yield having a molecular weight of 30,000 (Vapor Pressure Osmometry). The polymer was a pink fluffy solid, softening at 95° C. and melting before 150° C. This experiment will be repeated so that more polymer is available for further evaluation.

Catalysis by azobis(isobutyronitrile) failed to produce any polymer from pentafluorophenyl vinyl ether either at 60 or 130° C. Also the monomer can be distilled at atmospheric pressures without polymerization.

Thermal stability data on poly(pentafluorophenyl vinyl ether) have not as yet been determined. However, the data obtained concerning the pyrolysis of the smaller fluoroaryl ethers described earlier in the application may be useful in determining decomposition routes of the polymers. For example, pentafluorophenyl vinyl ether when polymerized is expected to yield a polymer similar to a substituted phenetole (Eq. 8).

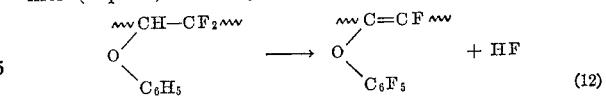

The small pentafluorophenetole molecule (Table II–A, R=CH₂CH₃) was shown to yield mainly pentafluorophenol. On this basis, the poly(pentafluorophenyl vinyl ether) would also be expected to give pentafluorophenol along with the unsaturated residue (Eq. 9).

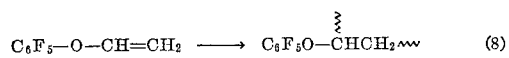

The fluoro-poly ethers may find use in ablative systems.

Polymers of 1,2-difluorovinyl (Eq. 10) and 2,2-difluorovinyl (Eq. 12) pentafluorophenyl vinyl ethers may use different modes for breakdown. The former probably

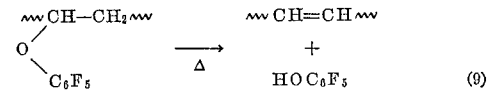

would yield pentafluorophenol (Eq. 10) as well as hydrogen fluoride (Eq. 11) since phenyltetrafluoroethyl ether gave these products on decomposition. The latter polymer (Eq. 12) should yield mainly hydrogen fluoride

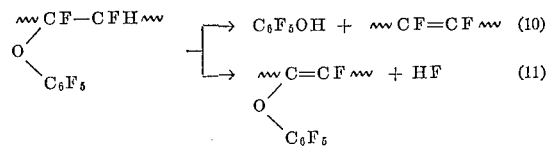

since there are no β-hydrogens available for pentafluorophenol formation (see Table II–A, R=CH₂CF₃).

Poly(pentafluorophenyl-1,2,2-trifluorovinyl ether) prepared previously should have good thermal stability since there is no ready route to decomposition as experienced above, especially in the absence of hydrogens. The difficulty in the past has been in obtaining high molecular weight polymers. Once this has been accomplished, the poly(pentafluorophenyl-1,2,2-trifluorovinyl ether) may have desirable physical characteristics such as chemical inertness and elastomeric properties as well as improved thermal stability.

INFRARED SPECTRA

The infrared spectrum was taken of all the new compounds prepared. Certain bands such as olefins, carbonyl, aromatic and aromatic ether were easily identified. Other bands, such as aliphatic ether, were more difficult to distinguish because of the intense absorption of fluorine in this region (1100 to 1000 cm.$^{-1}$) and as such, although these compounds contained an aliphatic ether group, no attempt was made to establish their position.

Since all the compounds contained the pentafluorophenoxy group, all the spectra showed bands common to this grouping. In general, the fluoroaromatic band was usually located at 1530 cm.$^{-1}$ while the fluoroaryl ether band was at 1171 ±10 cm.$^{-1}$. The latter observation supports the assigning of this band to the fluoroaryl ethers as reported recently for the fluorophenylene ethers. Other spectral characteristics will be discussed under the appropriate functional groups.

OLEFINS

The position of the band for unsaturation in the 2000 to 1600 cm.$^{-1}$ region has been shown to be strongly influenced by the number and location of the fluorine atoms directly attached to the double bond. Little change in frequency of the double bond has been observed between olefins as phenyl (1831 cm.$^{-1}$) and pentafluorophenyl (1829 cm.$^{-1}$) trifluorovinyl ethers so that the effect of fluorine substitution on the phenyl ring in these compounds is negligible. There is a difference of 50 cm.$^{-1}$ in observed frequency of the double bonds in perfluorostyrene (1780 cm.$^{-1}$) and pentafluorophenyl trifluorovinyl ether. The difference must be attributed to the oxygen atom probably due to the disruption of conjugation in the later compound. The negligible influence of fluorine substitution in the aromatic ring was further demonstrated from comparison between phenyl vinyl ether and pentafluorophenyl vinyl ether. Both compounds have identical olefin frequencies at 1640 cm.$^{-1}$. In 1,2-difluorovinyl pentafluorophenyl ether, the double bond frequency is located at 1786 cm.$^{-1}$ and compares favorably with trifluoroethylene (1780 cm.$^{-1}$) (non-conjugated) rather than perfluorostyrene (conjugated double bond).

CARBONYL AND HYDROXYL

The pentafluorophenoxy group in 2-pentafluorophenoxy) ethyl acetate has again little effect on the carbonyl frequency for it appears at its normal position for saturated acetates 1740 cm.$^{-1}$. Fluorine substitution for hydrogen in the acetoxy group of 2-pentafluorophenoxyethyl trifluoroacetate increases the carbonyl frequency to 1780 cm.$^{-1}$. The same effect is shown for the methyl and trifluoromethyl ketones, pentafluoroacetophenone (1720 cm.$^{-1}$) and perfluoroacetophenone (1760 cm.$^{-1}$). Besides, the carbonyl frequency, the acetate also shows the carbon-oxygen stretching frequency at 1230 cm.$^{-1}$ (normal) while the trifluoroacetate is at 1219 cm.$^{-1}$. In both of these compounds, the fluoroaryl ether (C—O—) band is at 1163 cm.$^{-1}$. In comparison with the above esters, pentafluorophenyl acetate shows the carbonyl frequency at 1814 cm.$^{-1}$, and only a single band at 1181 cm.$^{-1}$ (fluoroaryl ether), in keeping with its structure.

2-pentafluorophenoxyethanol was the aliphatic hydroxyl compound investigated in this series. The main hydroxyl frequency appears at 3450 cm.$^{-1}$ and probably indicates extensive hydrogen bonding in the molecule (free hydroxyl at 3650–3590 cm.$^{-1}$). As in the acetates, the fluoroaryl ether band is at 1163 cm.$^{-1}$. A small band appears at 1220 cm.$^{-1}$ and it may be due to the OH deformation frequency.

MISCELLANEOUS

The following compounds as well as those mentioned above, all show the fluoroaryl ether band: 2-pentafluorophenoxyethyl chloride (1163 cm.$^{-1}$), 2-pentafluorophenoxyethyl bromide (1163 cm.$^{-1}$), 1,2-bis(pentafluorophenoxy)ethane (1163 cm.$^{-1}$), 2-pentafluorophenoxy-1,1,1-trifluoroethane (1181 cm.$^{-1}$), pentafluorophenetole (1181 cm.$^{-1}$) and pentafluoroanisole (1168 cm.$^{-1}$). For comparison purposes, some phenoxy bands are given for anisole (1256 cm.$^{-1}$) and phenyl 1,1,2,2-tetrafluoroethyl ether (1212 cm.$^{-1}$).

EXPERIMENTAL

Infrared spectra were obtained with a Perkin-Elmer "Infra Cord" using a 0.025 mm. sodium chloride cell for liquid samples or from pellets containing 1–2 mg. of the solid sample and 300 mg. of potassium bromide. Molecular weight determinations were made by vapor pressure osmometry using a 1% solution of the polymer in benzene.

2-PENTAFLUOROPHENOXYETHYL BROMIDE

In n,n-dimethylformamide

A solution of 50 g. (0.23 mole) of potassium pentafluorophenoxide in 100 ml. of n,n-dimethylformamide was added to a solution of 50 g. (0.27 mole) of 1,2-dibromoethane in 100 ml. of dimethylformamide maintained at 90° C. After a slight induction period, potassium bromide began to precipitate and increased with time. When the addition was completed (0.5 hour) the contents were refluxed for two hours more, cooled and poured into 500 ml. of water. The bottom layer was separated and dried (CaSO$_4$). Distillation of the products afforded 30 g. (46%) of 2-pentafluorophenoxyethyl bromide (B.P. 112° C./10 mm., $n_D^{20}$=1.4647) and 9.82 (11%) of 1,2-bis(pentafluorophenoxy)ethane (B.P. 108–110° C./0.8 mm., M.P. 31–32° C.).

*Analysis.*—Calculated for C$_8$H$_4$BrF$_5$O: C, 33.0; H, 1.4; F, 32.7; Br, 27.5. Found: C, 33.6; H, 1.3; F, 31.0; Br, 24.5.

*Analysis.*—Calculated for C$_{14}$H$_4$F$_{10}$O$_2$: C, 42.9; H, 1.0. Found: C, 42.8; H, 1.3.

In tetrahydrofuran

A solution of 100 ml. of tetrahydrofuran, 11 g. (0.05 mole) of potassium pentafluorophenoxide and 19 g. (0.1 mole) of 1,2-dibromoethane were refluxed for 18 hours. Very little potassium bromide was noticed. At the end of this time period, the contents were cooled and poured into 200 ml. of water. The bottom layer was separated, dried (CaSO$_4$) and distilled. After removal of 10 g. of recovered 1,2-dibromoethane, 1.5 g. (10.4%) of 2-pentafluorophenoxyethyl bromide was obtained. No 1,2-bis(pentafluorophenoxy)ethane was isolated from this reaction.

2-PENTAFLUOROPHENOXYETHYL CHLORIDE

To 18 g. (0.2 mole) of 1,2-dichloroethane in 25 ml. of n,n-dimethylformamide at 80° C. was added 5 g. (0.025 mole) of potassium pentafluorophenoxide in 25 ml. of dimethylformamide. When the addition was completed (0.5 hour), the mixture was refluxed for one hour, then cooled and diluted with 150 ml. of water. The usual workup and distillation gave 3.1 g. (56%) of 2-pentafluorophenoxyethyl chloride, B.P. 74–75° C./2 mm.; $n_D^{20}$=1.4442.

*Analysis.*—Calculated for C$_8$H$_4$ClF$_5$O: C, 39.0; H, 1.6; Cl, 14.3. Found: C, 40.1; H, 1.9; Cl, 12.9.

1,1-BIS(PENTAFLUOROPHENOXY)ETHANE

To 21.9 (0.11 mole) of 1,1-dibromoethane in 25 ml. of n,n-dimethylformamide at 90° C. was added 5 g. (0.025 mole) of potassium pentafluorophenoxide in 25 ml. of n,n-dimethylformamide. After the addition (0.25 hour) the solution was refluxed for four hours, cooled and diluted with 150 ml. of water. The usual workup procedure, followed by distillation, yielded 0.9 g. (10%) of 1,1-bis(pentafluorophenoxy)ethane, B.P. 84–85° C./0.6 mm., M.P. 25–27° C.

*Analysis.*—Calculated for C$_{14}$C$_4$F$_{10}$O$_2$: C, 42.7; H, 1.0. Found: C, 43.4; H, 1.5.

2-PENTAFLUOROPHENOXY-1,1,1-TRIFLUOROETHANE

To 100 g. (1 mole) of trifluoroethanol in 250 ml. of tetrahydrofuran was added in small pieces, 22.9 g. (1 g.-atom) of sodium metal. When the evolution of hydrogen had ceased, the solution was added dropwise to a solution of 250 g. (1.35 moles) of hexafluorobenzene in 125 ml. of pyridine, maintained at 80° C. When the addition was completed (2 hours), the mixture was refluxed for two hours more. The contents were cooled and filtered from the sodium fluoride precipitate. The filtrate was poured into 5000 ml. of 10% hydrochloric acid solution. The bottom fluorocarbon layer was separated and dried (CaSO$_4$). Distillation afforded 82 g. (33%) of recovered hexafluorobenzene; 159 g. (66.2% based on recovered C$_6$F$_6$) of 2-pentafluorophenoxy-1,1,1-trifluoroethane, B.P. 146.5–147° C.; $n_D^{23}$=1.3799; and 34 g. (10.9% based on recovered C$_6$F$_6$) of bis(trifluoroethoxy)-tetrafluorobenzene, B.P. 111–113° C./10 mm., M.P. 67–69° C.

*Analysis.*—Calculated for C$_8$H$_2$F$_8$O: C, 36.3; H, 0.76; F. 57.2. Found: C, 36.4; H, 0.7; F, 56.2.

*Analysis.*—Calculated for C$_{10}$H$_4$F$_{10}$O$_2$: C, 34.8; H, 1.2; F, 55.0. Found: C, 34.8; H, 1.2; F, 53.9.

PENTAFLUOROPHENETOLE

Pentafluorophenetole was prepared in much the same manner as reported previously except the following quantities were used: 150 ml. of absolute ethanol, 150 ml. of tetrahydrofuran, 22.9 (1 g.-atom) of sodium metal, 250 g. (1.35 moles) of hexafluorobenzene and 125 ml. of pyridine. Pentafluorophenetole was obtained in 74% (144 g.) yield, B.P. 152–153° C., $n_D^{23}$=1.4120.

2-pentafluorophenoxyethanol

A solution of 25 ml. of tetrahydrofuran and 25 g. (0.2 mole) of 2-bromoethanol was added to a solution of 36 g. (0.16 mole) of potassium pentafluorophenoxide in 100 ml. of tetrahydrofuran at 64.° C. The mixture was refluxed for 3 hours and cooled. The usual workup afforded 16 g. (53% based on recovered C$_6$F$_5$OH, 6 g.) of 2-pentafluorophenoxyethanol, B.P. 82–83°C./1.5 mm. $n_D^{23}$=1.4419.

*Analysis.*—Calculated for C$_8$H$_5$F$_5$O$_2$: C, 42.2; H, 2.2. Found: C, 41.6; H, 2.3.

2-pentafluorophenoxyethyl acetate

To 5 g. (0.02 mole) of 2-pentafluorophenoxyethanol and 5 g. (0.05 mole) of acetic anhydride were added 0.1 g. of potassium acetate and the solution refluxed for 2 hours. The contents were neutralized by the addition of saturated sodium bicarbonate solution. The bottom fluorocarbon layer was washed with 25 ml. of water, separated, dried (CaCl$_2$) and distilled. 2-pentafluorophenoxyethyl acetate was obtained in 71% yield, B.P. 90–91° C./1.5 mm., $n_D^{20}$=1.4352.

*Analysis.*—Calculated for $C_{10}H_7F_5O_3$: C, 45.3; H, 2.6. Found: C, 44.6; H, 2.5.

2-pentafluorophenoxyethyl trifluoroacetate

This compound was prepared in similar fashion as described above. From 5 g. (0.02 mole) of 2-pentafluorophenoxyethanol, 5 g. of trifluoroacetic anhydride and 0.1 g. potassium carbonate there was obtained 5 g. (70%) of 2-pentafluorophenoxyethyl trifluoroacetate, B.P. 88–89° C./15 mm., $n_D^{20}=1.4048$.

*Analysis.*—Calculated for $C_{10}H_4F_8O_3$: C, 37.8; H, 1.24. Found: C, 37.8; H, 1.20.

Pentafluorophenyl vinyl ether

Eighty-two grams (0.45 mole) of pentafluorophenol, 5 g. of potassium hydroxide and 150 ml. of n,n-dimethylacetamide were placed and sealed into a 1400 ml. bomb. The bomb was attached to a high vacuum line by an outlet valve. After cooling (−190° C.) and evacuating the bomb, 13.62 l. (0.61 mole) of acetylene gas were measured and condensed into the bomb. It was then sealed and allowed to warm to 25° C. The bomb was rocked and heated to 200° C. (at this temperature, maximum pressure was 160 p.s.i.) for 1½ hours or until no change in pressure was observed. The bomb was cooled and bled of excess acetylene. The contents were poured into 200 ml. of water and extracted several times with 100 ml. portions of methylene chloride. The organic layers were combined and dried ($CaSO_4$). After removal of the solvent by distillation there was obtained 47.4 g. (50%) of pentafluorophenyl vinyl ether, B.P. 141–142° C., $n_D^{20}=1.4252$.

*Analysis.*—Calculated for $C_8H_3F_5O$: C, 45.8; H, 1.44. Found: C, 46.3; H, 1.50.

From the residue, 1,1-bis(pentafluorophenoxy)ethane (10%) was obtained having similar characteristics as described earlier. Small amounts of other products were also obtained but these were not investigated.

Phenyl vinyl ether

This compound was prepared from 2-pentafluorophenoxyethyl bromide and potassium hydroxide.

1,2-difluorovinyl pentafluorophenyl ether

A 800 ml. bomb containing 100 g. (0.45 mole) of anhydrous potassium pentafluorophenoxide, 300 ml. of dry benzene and 100 ml. of dry ($LiAH_4$) tetrahydrofuran was attached to a high vacuum line, cooled (−196° C.) and evacuated. Into the bomb by means of the vacuum line was condensed 110 g. (1.34 moles) of trifluoroethylene. The sealed bomb was allowed to warm to 25° C. It was then rocked and heated to 230° C. at which temperature the pressure dropped from 1600 p.s.i. to 800 p.s.i. over a one hour period. The bomb was cooled and opened. The contents were poured into a suitable container and the liquids flash distilled. The residual solids were washed with benzene (100 ml.) and the benzene layer was combined with the flash distillate and the aggregate distilled. After the solvents were removed, there was obtained 36 g. of a colorless liquid, B.P. 133–139° C. which contained 90% of the 1,2-difluorovinyl pentafluorophenyl ether. A pure sample of this ether was obtained by preparative scale vapor-phase chromatography, using 20% Viton A-celite column at 150° C. The pure ether (B.P. 132–132.5° C., $n_D^{23}=1.3940$) was eluted first. The impurity appears to be mainly the saturated ether, pentafluorophenyl 1,1,2-trifluoroethyl ether, B.P. 155–158° C. (impure).

Pyrolysis procedure

The pyrolysis apparatus consisted of a Pyrex tube 45 cm. long and 1 cm. wide having a female 14/20 joint at the top and a 14/20 joint at the bottom. A pressure equalizing 25 ml. addition funnel was placed at the top of the tube. The top of the funnel was connected to the nitrogen carrier gas inlet system. To the bottom end of the pyrolysis tube a 14/20 jointed connector was fitted which had take-offs to the first and second traps. The second trap was usually connected to a drying tube (atmospheric pressure runs) or to a vacuum pump for reduced pressure experiments. Both traps were cooled by Dry Ice-acetone mixtures. The packing (5-inch cross section) was usually supported by a constriction in the glass tube. The tube was heated by a tube furnace to the desired temperature and the compounds were added dropwise from the addition funnel. Nitrogen flow rate was usually 3.5 cc./minute. Other conditions are listed in Tables I and II. The first trap usually contained most of the pyrolysate. Upon warming, a sample of the pyrolysate was analyzed by vapor-phase chromatography using columns of 20% silicone oil on celite. Identification of the components of the pyrolysate was made by comparison of the retention times with those of known samples. The relative percentage composition of the pyrolysate was obtained from the peak height and width of the individual components.

Basic reagents

The details are listed in Table III. The compound and the aqueous potassium hydroxide were mixed at 25° C., then heated at 100° C. for one hour, cooled and the aqueous solution was extracted with methylene chloride to remove the neutral compounds. Acidification of the basic layer with 10% hydrochloric acid gave pentafluorophenol. Where the solid potassium hydroxide pellets were used, a bed of solid potassium carbonate was employed to protect the glass surface during the reaction. The $KOH$—$K_2CO_3$ mixture was heated to 200° C. before the sample was added dropwise. The sample was then refluxed from the $KOH$—$K_2CO_3$ mixture for one-half hour before allowing distillation to proceed. Cleavage products, usually pentafluorophenol, were obtained by acidification of the base after dilution with water. Pyrolyses over 20% $KOH$— charcoal pellets was accomplished in the same apparatus as described above. Products were identified by vapor-phase chromatography.

Acid reactions

Concentrated sulfuric acid (98%) was the only acid employed in these reactions as listed in Table IV. The acid and the compound were mixed at room temperature, then heated at 125° C. for one hour. Most of the compounds were immiscible with the reagent and occasionally shaking and swirling were necessary. The products were isolated by cooling the reactants to 0° C. in an ice bath, then adding crushed ice to the acid solution. The fluorocarbon layer could be separated from the aqueous layer. Identification of products was made by vapor-phase chromatography.

POLYMERIZATION REACTIONS

Pentafluorophenyl vinyl ether

*With α,α-azobisisobutyronitrile (ABIN).*—To 1 g. of pentafluorophenyl vinyl ether in a Pyrex tube was added 0.01 g. of ABIN. The tube was attached to a high vacuum line and degassed before sealing. It was then placed in a bath maintained at 60° C. At the end of a twenty-four hour period only a slight yellow color developed. The temperature was raised to 130° C. After seven days, the contents were a darker yellow in color, but no polymerization had occurred. Recovered monomer (97%) was the main material. Only a trace of a brown solid was obtained, which was not investigated.

*With aluminum chloride.*—To 0.01 g. of anhydrous aluminum chloride was added a solution of 1 g. of pentafluorophenyl vinyl ether in 5 ml. of anhydrous benzene. No reaction observed at this stage at 25° C. The solution was warmed to 50° C. and an additional 0.01 g. of aluminum chloride was added. An orange color developed on this addition, and after refluxing for two hours, the color changed to deep purple. After cooling to 25° C., 50 ml. of methanol was added to the benzene solution and the polymer was allowed to settle. The polymer was a yellow glassy material, M.P. 120–180° C., and its molecular weight was 2300.

*1,2-difluorovinyl pentafluorophenyl ether*

Into two quartz tubes were placed and sealed 1 g. each of 1,2-difluorovinyl pentafluorophenyl ether. One of the tubes also contained 0.01 g. of ABIN. Both tubes were irradiated for 3½ days with an ultraviolet lamp at a distance of 10 inches at 25° C. No visible reaction was evident. The tubes were then placed in a furnace at 110° C. for four more days. At the end of this period, the contents of both tubes were viscous and black in color. Some solid was observed in both tubes. The tube containing ABIN had twice as much black liquid than the blank tube. The products of these reactions are still under investigation, but appear to be mainly dimers.

Obviously many modifications and variations of the present invention are possible in the light of the above teachings. It is therefore to be understood that within the scope of the appended claims the invention may be practiced otherwise than as specifically described.

TABLE I
PYROLYSIS OF $C_6F_5OCH_2CH_2R$

| R | Wt. (g.) | Packing | Temp. (° C.) | Press. (mm.) | Wt. (g.) Press. | Products |
|---|---|---|---|---|---|---|
| Br | 3 | Glass helices | 500 | 760 | 2.5 | 37% $C_6F_5OCHBrCH_3$, 19% $C_6F_5OH$, 15% $C_6F_5OCH=CH_2$, 4% $C_6F_5OCH_2CH_2Br$, 2% $(C_6F_5O)_2CHCH_3$. |
| Cl | 1 | ----do---- | 520 | 760 | 0.75 | 70% $C_6F_5OCH_2CH_2Cl$, 5% $C_6F_5OH$, 5% $C_6F_5OCH=CH_2$, 1% $C_6F_5OCClHCH_3$. |
| OAc | 1.3 | ----do---- | 560 | 760 | 0.9 | 35% $C_6F_5OH$, 20% $C_6F_5OCH=CH_2$, 15% $CH_3CO_2H$, 20% 7-products. |
| OAc | 1.3 | ----do---- | 600 | 0.8 | 1.0 | 75% $C_6F_5OCH_2OAc$, 10% $C_6F_5OH$, 3% $C_6F_5OCH=CH_2$, 2% $CH_3CH_2H$. |
| OAcF_3 | 2 | ----do---- | 540 | 25 | 1.6 | 70% $C_6F_5OCH_2CH_2OAcF_3$, 25% $C_6F_5OH$, $CF_3CO_2H$, $C_6F_5OCH=CH_2$. |
| $OC_6F_5$ | 3 | ----do---- | 480 | 760 | 2.6 | 70% $C_6F_5OCH_2CH_2OC_6F_5$, 14% $C_6F_5OH$. |
| OH | 5 | $Al_2O_3$ pellets | 420 | 760 | 2.0 | 99% $C_6F_5OH$. |
| OH | 3 | ----do---- | 300 | 760 | 1.2 | 99% $C_6F_5OH$. |
| OH | 2 | $KHSO_4$ | 220 | 50 | 1.7 | No reaction. |

TABLE II
A.—PYROLYSIS OF $C_6F_5OR$*

| R | Wt. (g.) | Packing | Temp. (° C.) | Wt. (g.) Recovered | Products |
|---|---|---|---|---|---|
| $CH=CH_2$ | 2 | Glass helices | 500 | 1.7 | 90% $C_6F_5OCH=CH_2$, 5% $C_6F_5OH$. |
| $CH=CH_2$ | 2 | ----do---- | 600 | 1.6 | 60% $C_6F_5OCH=CH_2$, 25% $C_6F_5OH$. |
| $CH_3$ | 2 | ----do---- | 525 | 1.6 | 95% $C_6F_5OCH_3$, 2% $C_6F_5OH$. |
| $CH_2CH_3$ | 2 | ----do---- | 525 | 1.4 | 60% $C_6F_5OCH_2CH_3$, 25% $C_6F_5OH$, 10% others. |
| $CH=CH_2$ | 0.8 | ----do---- | 525 | 1.6 | 50% $C_6F_5OCH=CH$, 50% $C_6F_5OH$. |
| H | 1.0 | | | | |
| $OC_6F_5$ \| $-CH-CH_3$ | 2.5 | ----do---- | 520 | 2.0 | 49% $C_6F_5OH$, 49% $C_6F_5OCH=CH_2$, 2% $(C_6F_5O)_2CH-CH_3$. |
| $CH_2CF_3$ | 2 | ----do---- | 500 | 1.8 | 80% $C_6F_5OCH_2CF_3$, 5% $C_6F_5OCH=CF_2$, 5% 7-products. |
| $CH_2CF_3$ | 2 | Charcoal pellets | 460 | 2.5 | 100% $C_6F_5OCH_2CF_3$. |

B.—PYROLYSIS OF $C_6H_5-O-R$*

| R | Wt. (g.) | Packing | Temp. (° C.) | Wt. (g.) Recovered | Products |
|---|---|---|---|---|---|
| $CH_2CH_3$ | 2 | Glass helices | 525 | 1.5 | 98% $C_6H_5OCH_2CH_3$. |
| $CH=CH_2$ | 2 | ----do---- | 520 | 1.6 | 60% $C_6H_5OCH=CH_2$, 25% $C_6H_5OH$. |
| $CH_2CH_2Br$ | 25 | Glass | 400 | 20 | 98% $C_6H_5OCHBr-CH_3$. |

*All at atmospheric pressure.

TABLE III
REACTION OF $C_6F_5OR$ WITH SOME BASES

| R | Wt. (g.) | Base (g.) | Temp. (° C.) | Wt. (g.) Recovered | Products |
|---|---|---|---|---|---|
| $-CH_2CH_2Br$ | 8.5 | KOH (5), paraffin oil (5) | 180 | 3.5 | 86% $C_6F_5OCH_2CH_2Br$, 14% $C_6F_5OH$. |
| $-CH_2CH_2Br$ | 3 | KOH (5), $K_2CO_3$ (10) | 200 | 1.2 | 50% $C_6F_5OCH_2CH_2Br$, 50% $C_6F_5OCH=CH_2$. |
| $CH_2CH_2Br$ | 5 | KOH (5), $H_2O$ (20) | 100 | 4.0 | 62% $C_6F_5OCH_2CH_2Br$, 37% $C_6F_5OH$. |
| $CH_2CH_2Br$ | 5 | Collidine | 160 | 3.0 | 83% $C_6F_5OCH_2CH_2Br$, 16% $C_6F_5OCH=CH_2$. |
| $OC_6F_5$ \| $-CHCH_3$ | 0.4 | KOH (1), $H_2O$ (5) | 100 | 0.3 | No reaction. |
| $CH_2CF_3$ | 8.5 | KOH (5), $K_2CO_3$ (10) | 200 | 8.0 | Do. |
| $CH_2CF_3$ | 1.4 | MgO (6) | 150 | 1.3 | Do. |
| $CH_2CF_3$ | 20 | 20% KOH/charcoal | 480 | 16 | 85% $C_6F_5OCH_2CF_3$, 15% $C_6F_5OCH=CF_2$. |
| $CH_2CF_3$ | 2 | ----do---- | 550 | | Decomposed. |
| $CF_2CF_2H$ | 2 | ----do---- | 550 | | Do. |

TABLE IV
REACTION OF $C_6F_5OR$ WITH SULFURIC ACID

| R | Wt. (g.) | $H_2SO_4$ (ml.) | Wt. (g.) Recovered | Products |
|---|---|---|---|---|
| $-CH_2CH_2Br$ | 1 | 7 | 0.5 | 99% $C_6F_5OH$. |
| $-CH_2CF_3$ | 3 | 7 | 2.7 | No reaction. |
| $CH_2-CH_3$ | 5 | 10 | 3.2 | 60% $C_6F_5OH$, 40% $C_6F_5OCH_2CH_3$. |
| $CH_2CH_2OH$ | 1.5 | 7 | 1 | 50% $C_6F_5OH$, 50% $C_6F_5OCH_2CH_2OH$ |
| $O-C_6F_5$ \| $-C-CH_3$ \| H | 0.3 | 1 | | Decomposed, some $C_6F_5OH$. |

We claim:
1. The monomer pentafluorophenylvinyl ether,

$$C_6F_5-O-CH=CH_2$$

2. A homopolymer of the monomer of claim 1.

3. The monomer 1,2-difluorovinyl pentafluorophenyl ether, $C_6F_5$—O—CF=CFH.

4. A homopolymer of the monomer of claim 3.

5. The monomer 2,2-difluorovinyl pentafluorophenyl ether, $C_6F_5$—O—CH=$CF_2$.

6. A homopolymer of the monomer of claim 5.

References Cited

UNITED STATES PATENTS

| | | | |
|---|---|---|---|
| 2,430,017 | 11/1947 | Houk | 260—479 |
| 3,056,843 | 10/1962 | Wismer | 260—613 |
| 3,131,166 | 4/1964 | Harris et al. | 260—47 |

JOSEPH L. SCHOFER, *Primary Examiner.*

H. WONG, *Assistant Examiner.*